United States Patent [19]

Sakomura et al.

[11] 3,864,321

[45] Feb. 4, 1975

[54] STYRENE CHLOROPRENE COPOLYMERS

[76] Inventors: Toshio Sakomura; Hideshige Hayashi; Takayuki Kino; Takeshi Hironaka; Fumishige Nakane, all of 4560 Oaza Tonda, Shin-Nany Shi, Japan

[22] Filed: Aug. 21, 1973

[21] Appl. No.: 390,205

Related U.S. Application Data

[63] Continuation-in-part of Ser. No. 205,379, Dec. 6, 1971, abandoned.

[52] U.S. Cl. ............................................ 260/87.5 R
[51] Int. Cl. ............................................... C08f 1/80
[58] Field of Search ............................... 260/87.5 R

[56] References Cited
UNITED STATES PATENTS

| | | | |
|---|---|---|---|
| 3,190,865 | 6/1965 | Miller | 260/92.3 |
| 3,347,837 | 10/1967 | Smith | 260/87.5 |

*Primary Examiner*—Stanford M. Levin

[57] ABSTRACT

Chloroprene copolymers are prepared by copolymerising a mixture of chloroprene (95 to 80 percent by weight of the mixture) and styrene (5 to 20 percent by weight of the misture) at a temperature in the range 45° to 60°C in the presence of an alkyl xanthogen disulphide.

3 Claims, No Drawings

STYRENE CHLOROPRENE COPOLYMERS

This is a continuation-in-part of application Ser. No. 205,379 filed Dec. 6, 1971, and now abandoned.

The present invention relates to a process for the manufacture of chloroprene copolymers having good extrusion and tensile properties together with excellent low temperature resistance. It particularly relates to the manufacture of such chloroprene copolymers by copolymerising in an aqueous emulsion under carefully controlled conditions a mixture of styrene and chloroprene.

It is known that the low temperature resistance of a polymer can be increased by modifying in some way the regular structure of the polymer thus reducing its rate of crystallisation. This can be achieved by copolymerisation, but generally copolymerisation involves a serious drawback in that the tensile properties tend to deteriorate in proportion to the amount of comonomer added. Again, in order to maintain the good extrusion properties of the copolymer it is necessary to reduce the conversion level of monomeric material to polymer in proportion to the amount of comonomer added, which is undesirable. Another method of modifying the regular structure of a polymer is to raise the polymerisation temperature. The drawback involved with this method is that the tensile strength decreases as polymerisation temperature is raised. The extrusion characteristics are also found to deteriorate as polymerisation temperature is raised. These adverse effects are particularly noticeable when the polymerisation temperature exceeds 45°C.

Thus, it will be seen that methods which may be used to increase low temperature resistance tend to produce adverse effects on the extrusion and the tensile properties which confirms the already known fact that good extrusion and tensile properties are incompatible with low temperature resistance. Thus, commercially available polychloroprene rubbers of good low temperature resistance tend to have poor extrusion and tensile properties and vice versa.

Copolymers of styrene and chloroprene made at relatively low temperatures are known and have poor extrusion and tensile properties. Furthermore, when the copolymerisation of styrene and chloroprene is carried out at higher temperatures, the deterioration of the properties of the product is so great that it cannot be put to practical uses.

An object of this invention is to obtain chloroprene copolymers which simultaneously exhibit good extrusion and tensile properties and low temperature resistance.

According to the present invention the process for the production of a chloroprene copolymer comprises copolymerising in aqueous emulsion a monomer mixture of 95 to 80 percent by weight of chloroprene and 5 to 20 percent by weight of styrene at a temperature in the range 45° to 60°C. to a conversion in the range of 60 to 75 percent in the presence of a free radical initiator and an amount of alkyl xanthogen disulphide wherein each alkyl group contains from 1 to 8 carbon atoms to ensure a final copolymer having a Mooney Viscosity (ML 1+4) in the range 30 to 130.

The range of styrene to chloroprene/styrene mixture is preferably in the range 5 to 15 percent by weight. The amount chosen will depend on the properties required for the copolymer it being remembered that as the styrene content is reduced the low temperature properties of the copolymer fall away while as the amount used is increased, the extrusion and tensile properties deteriorate. However, within the range 5 to 20 percent by weight of styrene, good products can be obtained according to the process of the present invention.

It is important that the copolymerisation shall be carried out at a temperature in the range 45° to 60°C. The use of lower temperatures leads to poor low temperature properties and the use of higher temperatures to poor extrusion properties.

It is preferred to carry the copolymerisation reaction to a conversion of about 70 percent.

Examples of alkyl xanthogendisulfides that can be employed include dimethyl-xanthogendisulfide, diethyl-xanthogendisulfide, diisopropyl-xanthogendisulfide, di-n-propyl-xanthogendisulfide, diisobutyl-xanthogendisulfide and di-n-amyl-xanthogendisulfide. Such alkyl xanthogen disulphides are conventionally used in chloroprene polymerisation and can be represented by the formula

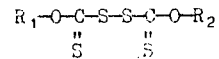

in which $R_1$ and $R_2$ are alkyl groups containing from one to eight carbon atoms. The preferred compounds are those in which the alkyl groups each contain from 2 to 5 carbon atoms. The xanthogen disulfide has the effect of controlling the molecular weight of the polymer during the process of polymerisation and thus by adjusting the amount used, the Mooney Viscosity of the rubber can be controlled.

The Mooney Viscosities quoted in this specification are measured according to the ASTM-D-927-49T. The process of the present invention is particularly useful for the manufacture of copolymers having a Mooney Viscosity in the range 30 to 60. Generally, the amount of alkyl xanthogen disulphide necessary to obtain the desired Mooney Viscosities is such that the amount of sulphur in the xanthogen disulphide is in the range 0.2 to 6.0 percent by weight on the styrene present in the chloroprene/styrene mixture. When using low proportions of styrene in the above range it may be necessary to employ a higher level of xanthogen disulphide in order to obtain a given Mooney Viscosity for the final product than is necessary when a high proportion of styrene is used.

The polymerisation process according to the present invention is brought about under emulsion polymerisation conditions as conventionally used for the polymerisation of chloroprene. The usual emulsifiers, stabilisers, initiators and the like can be employed.

In the aqueous emulsion polymerisation of chloroprene by conventional techniques the monomer content of the aqueous emulsion is not critical, buut usually ranges from 30 to 60 percent by weight of the total weight of the emulsion. As usual in chloroprene polymerisations, oxygen is excluded from the atmosphere above the polymerisation medium. This is conveniently done by sweeping the reaction vessel with a stream of an inert gas, such as nitrogen, and maintaining a nitrogen atmosphere over the polymerisation medium. The temperature is adjusted by conventional methods to 45° to 60°C.

The polymerisation system may be slightly acid, neutral or alkaline. The choice is primarily influenced by the alkali dependence of the emulsifying agent.

Examples of conventional emulsifying agents used in chloroprene polymerisation are water soluble salts of compounds of the following types: long-chain fatty acids; dimerised fatty acids; rosins and modified rosins or partially polymerised rosins; fatty alcohol sulfates; and arylsulfonic acids or formaldehyde condensates thereof, such as nonylbenzenesulfonic acid or the formaldehyde condensation product of naphthalenesulfonic acid.

Conventional initiators for the emulsion polymerisation of chloroprene are used in the process of the present invention. These are of the free radical type and examples are hydrogen peroxide, ammonium persulphate and other water soluble salts of persulphonic acid such as potassium persulphate. Water insoluble peroxides and hydroperoxides can be used, usually in conjunction with a water soluble reducing compound to form what is known as a redox polymerisation initiator. Examples of hydroperoxides are compounds having the formula

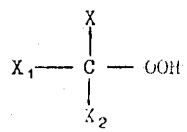

wherein X, $X_1$ and $X_2$ are independently selected from the group consisting of aliphatic acyclic, aliphatic cyclic, aryl, alkaryl and aralkyl radicals, with the proviso that two or three of the X's together with the carbon atoms attached to the hydroperoxy group may be joined to form a ring system containing from 1 to 2 rings with each ring containing from 5 to 6 carbon atoms and with the further proviso that the carbon atom directly attached to the hydroperoxy group is not part of an aromatic ring. Examples of suitable organic hydroperoxides include cumene hydroperoxide, ($\alpha,\alpha$-dimethylbenzyl hydroperoxide), tertbutyl hydroperoxide, diisopropylbenzene hydroperoxide, pinane hydroperoxide, menthane hydroperoxide (which is the hydroperoxide of 1-isopropyl-4-methyl cyclohexane) and p-dodecyl $\alpha,\alpha$-dimethylbenzene hydroperoxide. Another group of suitable hydroperoxides is the ketone peroxides such as cyclohexanone peroxide and methyl ethyl ketone peroxide. Methyl ethyl ketone peroxide, for example, is a mixture consisting predominantly of

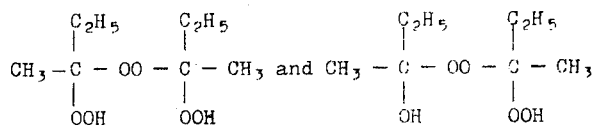

Such organic peroxides are conventionally used in the aqueous emulsion polymerisation of chloroprene in conjunction with reducing agents such as the water soluble inorganic hydrosulphites or pyrosulphites or mixtures thereof. Because of their ready availability, the sodium salts are preferred. Sodium hydrosulfite (also called sodium dithionite) is available as the dihydrate ($Na_2S_2O_4 \cdot 2H_2O$). Sodium pyrosulfite (also called sodium metabisulfite) has the formula $Na_2S_2O_5$. The quantity of these components will vary somewhat depending on the activity of individual lots of chloroprene monomer. In general, at least a total of about 0.05 part by weight, per 100 parts by weight of chloroprene is required to initiate and maintain polymerisation at a satisfactory rate. The preferred range is from about 0.06 to about 0.12 part. Usually no more than 0.5 part by weight of the salt per 100 parts by weight of the chloroprene is required to initiate and maintain polymerisation. A preferred method is to initiate polymerisation by adding 50 to 90 percent of the salt all at once and then to maintain polymerisation at the desired rate by gradual addition of the salt as required.

The following examples in which 2, 3, 4, 5, 6, 9, 10, 13 and 14 are according to the invention and 1, 11, 12, and 15 are by way of comparison, illustrate the present invention. Unless otherwise specifically stated "part" mentioned herein is a part by weight.

EXAMPLES 1 TO 14

Polymerisation of chloroprene/styrene mixtures, the composition ratio of which is shown in the Table, was carried out in an autoclave of 3 litres capacity equipped with stirrer. A conventional chloroprene polymerisation initiator system was continuously pumped into the reaction mixture. It consisted of potassium persulphate (0.0042 weight parts per 100 parts of monomer per hour - PHM/HR) and sodium $\beta$-anthraquinone sulfonate (0.0003 PHM/HR). The reaction mixture initially was charged with 0.3 parts by weight of sodium sulphate per 100 parts by weight of monomeric material. The remaining ingredients of the reaction mixture were as follows:

| | |
|---|---|
| Total of monomers | 1,000 parts |
| Disproportionated rosin soap (100%) | 50 do. |
| FNS Condensation product of sodium naphthalene sulphonate | 5 do. |
| Sodium hydroxide | 4 do. |
| Sodium sulphite | 3 do. |
| Deaerated water | 1,000 do. |

No xanthogen disulphide was employed in example 1, but 2.5 parts of n-dodecyl mercaptan were present to ensure a comparative Mooney viscosity: di-ethyl xanthogen disulphide was employed in example 2; diisopropyl xanthogendisulphide was employed in examples 3, 8, 9, 10 and 11; di-isoamyl xanthogen disulphide was employed in examples 4, 5, 6 and 7; and di-n-butyl xanthogen disulphide was employed in examples 12, 13, 14 and 15. In example 7 the styrene was replaced by methyl methacrylate.

All the polymerisation operations were conducted throughout in an atmosphere of nitrogen. In all cases the conversion was followed by measuring the specific gravity of the latex during polymerisation and the final value was calculated on the basis of the solid content of the resultant latex. In all cases the polymerisation process was stopped when the conversion reached a fixed point by adding a shortstop agent such as phenothiazine and a phenol derivative. The unreacted monomer remaining after the polymerisation was terminated was recovered by steam distillation and the latex was coagulated by the usual method, then washed and dried.

The results of tests on the products are shown in the Table. In these tests the processability of the products on a mill and the surface appearance of extruded products were judged by eye according to the scale: (excellent) A>B>C>D (bad). The die swell percentage was measured according to ASTM No. 1 with a compression ratio of 1.6/1 and a die temperature of 105°C. The low temperature resistance of the raw products was assessed by measuring the time in minutes for the Shore A hardness to increase 10 points above the initial value during storage at 0°C.

a conversion in the range of 60 to 75 percent in the presence of a free radical initiator and an amount of dialkyl xanthogen disulphide wherein each alkyl group contains from 1 to 8 carbon atoms to ensure a final copolymer having a Mooney Viscosity (ML 1+4) in the range of 30 to 130.

| Example No: | According to Invention | | | | | | | | | | | | | | |
|---|---|---|---|---|---|---|---|---|---|---|---|---|---|---|---|
| | | 2 | 3 | 4 | 5 | 6 | | | 9 | 10 | | | 13 | 14 | |
| Comparative | 1 | | | | | | 7 | 8 | | | 11 | 12 | | | 15 |
| Styrene in monomer mixture (wt%) | 10 | 10 | 10 | 10 | 10 | 10 | 10 | 10 | 10 | 10 | 10 | 3 | 5 | 15 | 22 |
| Polymerisation temp. (°C) | 50 | 50 | 50 | 50 | 50 | 50 | 50 | 40 | 45 | 60 | 65 | 55 | 55 | 55 | 55 |
| Sulphur in xanthogen disulphide (Weight % on styrene) | 0 | 0.6 | 1.2 | 2.8 | 3.0 | 0.20 | 2.0 | 1.15 | 1.15 | 1.15 | 1.15 | 1.80 | 1.80 | 0.60 | 0.60 |
| Final conversion | 68 | 65 | 68 | 69 | 69 | 70 | 67 | 73 | 72 | 70 | 70 | 69 | 69 | 68 | 65 |
| Mooney Viscosity of raw rubber (ML 1 + 4) | 46 | 46 | 46 | 41 | 40 | 48 | 45 | 44 | 43 | 46 | 43 | 48 | 47 | 41 | 43 |
| Mill processability | B | A | A | A | B | B | C | A | A | A | B | A | A | A | A |
| Surface appearance | B | A | A | A | A | A | B | A | A | A | B | B | A | A | B |
| Dieswell (%) | 50 | 29 | 30 | 29 | 32 | 40 | 46 | 23 | 30 | 36 | 52 | 42 | 36 | 34 | 42 |
| Elongation (%) | 550 | 600 | 630 | 650 | 660 | 580 | 580 | 630 | 630 | 620 | 610 | 590 | 600 | 600 | 610 |
| Tensile strength (kg/cm$^2$) | 190 | 230 | 245 | 240 | 240 | 210 | 195 | 245 | 245 | 240 | 230 | 230 | 240 | 210 | 200 |
| Low temp. resistance (minutes x 10$^{-3}$) | 13 | 13 | 13 | 13 | 13.5 | 13 | 10 | 2.5 | 5.2 | >20 | >20 | 2.8 | 7 | >20 | >20 |

We claim:

1. A process for the production of a chloroprene copolymer which comprises copolymerising in an aqueous emulsion a monomer mixture of 95 to 80 percent by weight of chloroprene and 5 to 20 percent by weight of styrene at a temperature in the range 45° to 60°C to 2. A process as claimed in claim 1, wherein the styrene forms from 5 to 15 percent of the monomer mixture.

3. A process as claimed in claim 1, wherein the alkyl groups in the dialkyl xanthogen disulphide each contain from 2 to 5 carbon atoms.

* * * * *